(12) United States Patent
Deng

(10) Patent No.: US 12,538,377 B2
(45) Date of Patent: Jan. 27, 2026

(54) METHOD FOR UPLINK DATA TRANSMISSION, USER EQUIPMENT, AND STORAGE MEDIUM

(71) Applicant: SPREADTRUM COMMUNICATIONS (SHANGHAI) CO., LTD., Shanghai (CN)

(72) Inventor: Yun Deng, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 358 days.

(21) Appl. No.: 18/248,921

(22) PCT Filed: Oct. 12, 2021

(86) PCT No.: PCT/CN2021/123220
§ 371 (c)(1),
(2) Date: Apr. 13, 2023

(87) PCT Pub. No.: WO2022/078317
PCT Pub. Date: Apr. 21, 2022

(65) Prior Publication Data
US 2023/0397290 A1    Dec. 7, 2023

(30) Foreign Application Priority Data

Oct. 15, 2020 (CN) .......................... 202011107462.5

(51) Int. Cl.
*H04W 76/27* (2018.01)
*H04W 74/00* (2009.01)

(52) U.S. Cl.
CPC ......... *H04W 76/27* (2018.02); *H04W 74/004* (2013.01)

(58) Field of Classification Search
CPC ........................... H04W 74/004; H04W 76/27
See application file for complete search history.

(56) References Cited

U.S. PATENT DOCUMENTS

| | | | |
|---|---|---|---|
| 2017/0367116 A1* | 12/2017 | Li | H04W 72/23 |
| 2019/0364600 A1 | 11/2019 | Liu et al. | |
| 2021/0105808 A1* | 4/2021 | Lei | H04L 5/0051 |
| 2021/0337625 A1* | 10/2021 | Tsai | H04W 76/27 |
| 2021/0410180 A1* | 12/2021 | Tsai | H04L 1/1819 |
| 2021/0410181 A1* | 12/2021 | Jeon | H04W 52/0258 |

(Continued)

FOREIGN PATENT DOCUMENTS

| | | |
|---|---|---|
| CN | 108366398 A | 8/2018 |
| CN | 110139365 A | 8/2019 |
| CN | 110139386 A | 8/2019 |

OTHER PUBLICATIONS

Intel Corporation,SDT mechanism on RRC/non-RRC based approaches and RACH requirements, 3GPP TSG RAN WG2 Meeting #111-e, R2-2006713, Aug. 28, 2020.

(Continued)

*Primary Examiner* — Melanie Jagannathan
(74) *Attorney, Agent, or Firm* — HAUPTMAN HAM, LLP

(57) ABSTRACT

A method for uplink data transmission, a user equipment (UE), and a storage medium are provided. The method is performed by a UE. The method includes: indicating in small data transmission (SDT) associated information of data to-be-transmitted when the UE is in an inactive state and has the data to-be-transmitted.

20 Claims, 5 Drawing Sheets

(56) References Cited

U.S. PATENT DOCUMENTS

| | | | | |
|---|---|---|---|---|
| 2022/0232659 | A1* | 7/2022 | Kim ..................... | H04W 76/28 |
| 2022/0346135 | A1* | 10/2022 | Chen ................... | H04W 72/569 |
| 2022/0386407 | A1* | 12/2022 | Kim ..................... | H04W 68/02 |
| 2023/0156847 | A1* | 5/2023 | Zhang .................. | H04W 76/20 |
| | | | | 370/329 |
| 2023/0180223 | A1* | 6/2023 | Tseng .................. | H04W 56/001 |
| | | | | 370/329 |
| 2023/0189245 | A1* | 6/2023 | Alfarhan ............... | H04L 1/1854 |
| | | | | 370/329 |
| 2023/0189380 | A1* | 6/2023 | Palat .................... | H04W 76/11 |
| | | | | 370/329 |
| 2023/0284289 | A1* | 9/2023 | Watts ................... | H04W 76/19 |
| | | | | 370/329 |
| 2024/0014979 | A1* | 1/2024 | Lei ........................... | H04L 5/16 |
| 2024/0090045 | A1* | 3/2024 | Agiwal ................. | H04W 76/27 |
| 2024/0215096 | A1* | 6/2024 | Zhang .................. | H04W 76/19 |

OTHER PUBLICATIONS

NEC, Initial consideration on RACH based SDT, 3GPP TSG-RAN WG2 #111 electronic, R2-2007195, Aug. 28, 2020.
WIPO, International Search Report and Written Opinion for International Application No. PCT/CN2021/123220, Jan. 14, 2022.

* cited by examiner

METHOD FOR UPLINK DATA TRANSMISSION, USER EQUIPMENT, AND STORAGE MEDIUM

CROSS-REFERENCE TO RELATED APPLICATION(S)

This application is a National Stage of International Application No. PCT/CN2021/123220, field Oct. 12, 2021, which claims priority to Chinese Patent Application No. 202011107462.5, filed Oct. 15, 2020, the entire disclosures of which are hereby incorporated by reference.

TECHNICAL FIELD

This application relates to the field of communication processing technology, and particularly to a method for uplink data transmission, a user equipment (UE), and a storage medium.

BACKGROUND

If a user equipment (UE) in an inactive state has data to be uploaded, the data can be transmitted after a radio resource control (RRC) connection is resumed, or transmission in the inactive state can be achieved by introducing small data transmission (SDT). If the UE needs to perform data transmission multiple times in the inactive state, a service beam of the UE may change. Considering that the UE in the inactive state may not frequently measure the beam and report a measurement result, a network may not provide data transmission for the UE through the original beam, resulting in failure of the data transmission multiple times and further affecting spectrum efficiency and a network performance.

SUMMARY

In a first aspect, a method for uplink data transmission is provided. The method is performed by a user equipment (UE). The method includes: indicating in small data transmission (SDT) associated information of data to-be-transmitted, when the UE is in an inactive state and has the data to-be-transmitted.

In a second aspect, a UE is provided. The UE includes a processor and a memory. The memory is coupled with the processor and stores programs. The programs include instructions which are operable with the processor to execute the operations of the method in the first aspect.

In a third aspect, a non-transitory computer-readable storage medium is provided. The non-transitory computer-readable storage medium stores computer programs which, when executed by a UE, cause the UE to execute the method in the first aspect.

BRIEF DESCRIPTION OF THE DRAWINGS

The following will give a description of accompanying drawings used for describing implementations of disclosure.

DETAILED DESCRIPTION

Hereinafter, implementations of the disclosure are depicted with reference to accompanying drawings used for the implementations of the disclosure.

The term "and/or" of the disclosure is merely used to describe an association relationship of associated objects, and indicates that there can be three relationships. For example, "A and/or B" means that: A alone, both A and B, or B alone. In addition, the character "I" herein generally indicates that associated objects before and after the character are in an "or" relationship.

The term "a plurality of/multiple" appearing in implementations of the disclosure means two or more. The descriptions of the "first", "second", and the like appearing in implementations of the disclosure are merely used for illustration and distinguishing described objects, and do not indicate an order, nor do they indicate a special limitation on the number of devices of implementations of the disclosure, which should not constitute any limitation to implementations of the disclosure. The "connection" appearing in implementations of the disclosure refers to various connection modes such as direct connection or indirect connection, to realize communication between devices, which is not limited in implementations of the disclosure.

Figure 1:
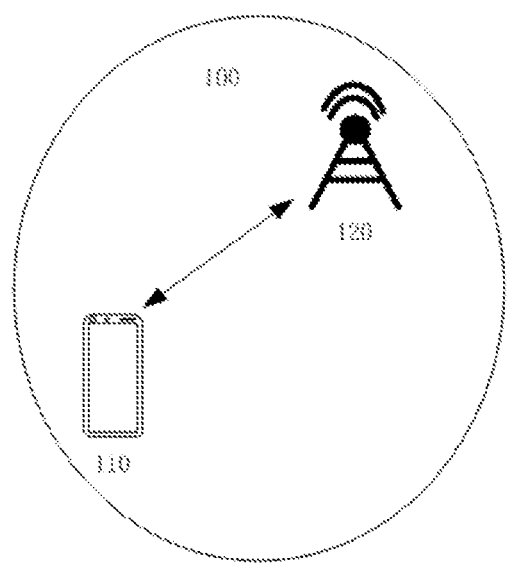
FIG. 1 is a system architecture diagram of an example communication system.

Technical solutions of implementations of the disclosure can be applied to an exemplary communication system 100 illustrated in FIG. 1. The communication system 100 includes a terminal 110 and a network device 120. The terminal 110 is communicatively connected to the network device 120.

In new radio (NR), when the UE has a service demand, the UE will access a network to establish a radio resource control (RRC) connection, to establish a dedicated bearer for data transmission. After the UE enters a connected state, a base station will allocate necessary parameters for the UE such as a security algorithm, L2-related configuration parameters, physical layer-related configuration parameters, and layer 3-related configuration parameters (e.g., wireless link failure parameter and other parameters). For the established bearer, the base station needs to know information about a channel which is established for the bearer and between a core network and the bearer. These parameters are referred to as UE context. When the UE enters an idle state from the connected state, the base station will release all parameters of the UE, that is, releasing the UE context. If the UE wants to establish a service again, the base station needs to reconfigure the above parameters for the UE. This process will be completed through multiple air interface signaling and NG interfaces (an interface between the base station and the core network) signaling.

In practice, different UEs may have different service demands. For example, some UEs may transmit data multiple times within a time period, and the time for each data transmission is limited. For this type of service demand, if the existing mechanism is adopted, a connection needs to be established for each data transmission, and the connection will be released once the data transmission is completed. Repeated multiple transmissions by the UE will cause a large number of signaling interactions, which in turn leads to an excessive network signaling load and a large decrease in efficiency of data transmission.

In NR, the inactive state is introduced, in which the UE does not perform data transmission with the network but can receive paging periodically. The network retains configuration of an RRC connection established by the UE, bearer configuration, security configuration, and parameter configuration of an NG interface related to the UE. The UE also needs to save the configuration of the RRC connection, the bearer configuration, the security configuration, and so on. When the UE in the inactive state has data to be transmitted, the UE can use the saved parameter configuration to quickly access the network and resume the RRC connection through an RRC resume procedure, and then perform data transmission. Since both the UE and the network have the RRC connection parameters of the UE, the UE can quickly access the network to transmit data. Since the UE does not have to establish an RRC connection and a bearer for data transmission, a lot of signaling can be saved.

Figure 2A:
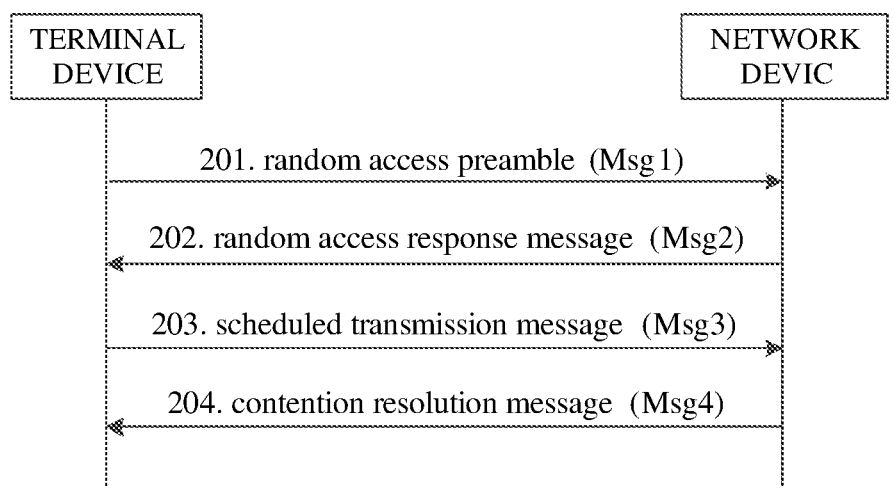
FIG. 2A is a schematic flowchart illustrating a random access procedure.

For a smart terminal, the UE in the inactive state may still have a small data transmission (SDT) demand. If the UE resumes the RRC connection for data transmission every time, transmission efficiency will still be low. FIG. 2A is a flowchart illustrating transmission of small data through a random access procedure by a UE in the communication system illustrated in FIG. 1, which belongs to one method in SDT. In the disclosure, small data transmission is defined as SDT, while the NR protocol may use the same abbreviation or a different name, which does not affect the application of the technical solution of the disclosure.

Referring to FIG. 2A, a random access procedure generally includes four steps.

At 201, a terminal device transmits a random access preamble to a network device, where the random access preamble is message 1 (Msg1) in the four-step random access procedure.

At 202, the network device transmits a random access response (RAR) message to the terminal device, where the RAR message is message 2 (Msg2) in the four-step random access procedure.

At 203, the terminal device transmits a scheduled transmission message to the network device, where the scheduled transmission message is message 3 (Msg3) in the four-step random access procedure.

At 204, the network device transmits a contention resolution message to the terminal device, where the contention resolution message is message 4 (Msg4) in the four-step random access procedure.

In order to realize the SDT, the base station will allocate relatively large uplink transmission resources for the UE in random access response, so that the UE can transmit small data in Msg3 (i.e., message 3), and at the same time transmit an RRC message such as containing identity information of the UE, etc.

Figure 2B:
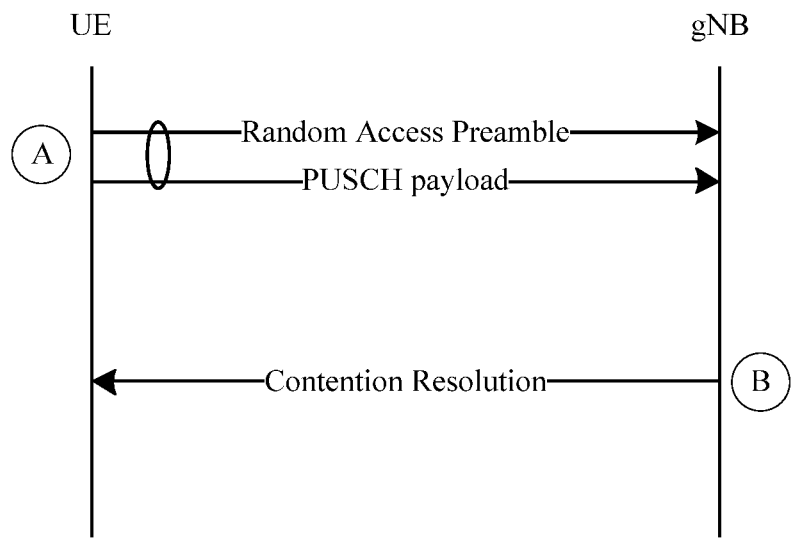
FIG. 2B is a schematic flowchart illustrating another random access procedure.

A two-step random access procedure is also introduced in NR. Another SDT method can be realized through two-step random access. Referring to FIG. 2B, in the two-step random access procedure, in the first step, a terminal device transmits message 1 and message 3 to a network device, where message 1 and message 3 are taken as message a (MsgA), in second step, the network device transmits message b (MsgB) to the terminal device, where message b is obtained by combining message 2 and message 4 illustrated in FIG. 2A. The UE can transmit small data in MsgA to realize another SDT method.

The UE camps on an NR serving cell and is in an inactive state.

The UE generates some data that needs to be transmitted to a network side. Considering that the amount of the data is small, the UE decides to use an SDT method.

Moreover, the UE finds that transmission of the data amount cannot be completed at one time. For a two-step random access method, the UE can know an amount of data that can be uploaded on a physical uplink shared channel (PUSCH) of the MsgA from configuration of two-step random access in a system message of a cell, and the UE can calculate, according to a size of physical resources occupied by the PUSCH and a modulation-coding scheme adopted, an amount of data that can be uploaded, which does not include a number of bits (that is, quantity, how many) occupied by RRC signaling that needs to be transmitted in the MsgA. For the four-step random access procedure, a resource size of Msg3 is allocated by the base station dynamically, and the UE cannot directly determine whether the entire transmission can be completed at one time without receiving a random access response. Generally, the base station will not allocate very large transmission resources to avoid resource waste. In this situation, the UE may assume that the base station allocates a fixed number of physical resource blocks (e.g., 4 PRBs) at one time, and determine whether transmission of data to-be-transmitted can be completed at one time according to an amount of data that can be transmitted on the 4 PRBs. Alternately, the UE may also monitor RAR messages of other UEs, know from these RAR messages a size of physical resources allocated by the base station at one time, so as to know an amount of data that can be transmitted at one time. Alternatively, when receiving a random access response transmitted by the base station, the UE may determine the amount of data that can be transmitted at one time according to allocated PUSCH resources. Alternatively, the base station may indicate through a system message an amount of data that is predicted to be transmitted at one time, so that the UE can accurately determine whether transmission of data to-be-transmitted can be completed at one time. The UE may continuously generate uplink data, in this situation, the UE may determine that transmission of data to-be-transmitted cannot be completed at one time.

Figure 3:
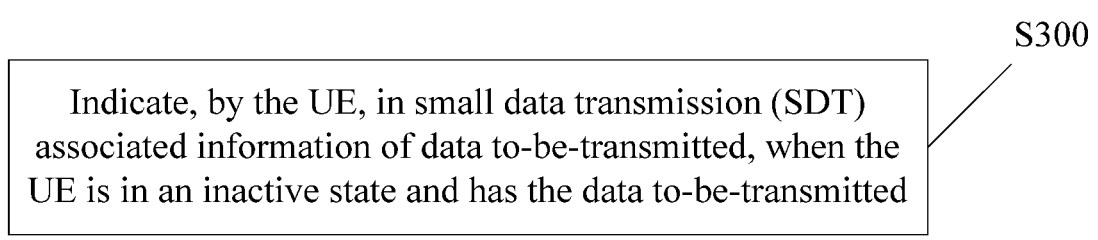
FIG. 3 is a schematic flowchart illustrating a method for uplink data transmission provided in implementations of the disclosure.

Referring to FIG. 3, FIG. 3 illustrates a method for uplink data transmission. The method can be executed in the communication system illustrated in FIG. 1. The SDT involved in this method may be any one of processes illustrated in FIG. 2A or FIG. 2B. As illustrated in FIG. 3, the method includes the following.

At S300, if a UE is in an inactive state and has data to-be-transmitted, the UE indicates in SDT associated information of the data to-be-transmitted.

According to the technical solution of the disclosure, when the UE is in the inactive state and has the data to-be-transmitted, the UE can indicate in the SDT the associated information of the data to-be-transmitted, and report the associated information to the base station, so that the base station can configure resources for the UE according to the associated information, thereby improving a network performance. The data to-be-transmitted may be data that is currently generated by a UE side and needs to be uploaded (which generally refers to data that is already in a buffer of layer 2, that is, available data), or may include data that will be generated by the UE and needs to be uploaded.

In an alternative implementation, the associated information of the data to-be-transmitted includes one or any combination of the following: an interval of resource allocation, an amount of data that can be transmitted in each resource allocation, a duration of data transmission, and a number of times (that is, quantity, how many) of subsequent resource allocation.

The duration of data transmission herein may be a total duration of the transmission, or may include a duration of each transmission, because the UE may generate data periodically, for example, uplink data needs to be transmitted every 40 ms, and each transmission needs to last for 6 ms. The duration of data transmission may refer to the duration of each transmission or the total duration of the data transmission. If the UE expects to transmit data of 100 periods and the period is 40 ms, the total duration of the transmission is 100×40=4000 ms.

In an alternative implementation, the method further includes: determining, by the UE, a service characteristic of the data to-be-transmitted, and indicating, by the UE, in the SDT the associated information of the data to-be-transmitted when the service characteristic is different from a service characteristic reported before the UE enters the inactive state. The UE may only indicate indicators of different service characteristics, and does not need to indicate complete service characteristics.

Before entering the inactive state, the UE generally indicates to the base station service characteristics of logical channels or different data radio bearers, such as an interval of service generation, a size of data generated each time, and other parameters. A network switches the UE into the inactive state when there is no data transmission on the data radio bearer or the logical channel. After a certain time period, new data is generated again on the data radio bearer or the logical channel of the UE, so the UE transmits the new data through the SDT method. However, a service characteristic corresponding to the newly generated data (e.g., an interval of data generation, a size of data generated each time) may be the same as or different from a service characteristic reported by the UE before. In order to save signaling, the interval of data generation and the size of data generated each time can be indicated when the service characteristic corresponding to the newly generated data is different from the service characteristic reported by the UE before. The duration of data transmission (or the number of times of subsequent resource allocation) also needs to be indicated.

In an alternative implementation, the service characteristic includes one or any combination of the following: a size of service data generated each time, an interval period of service generation, and a time deviation of service data generation.

The time deviation refers to a start time point at which data is generated in a period. As an example, the interval period of service generation is 40 ms, and data is generated at the sixth ms in the period of 40 ms.

In an alternative implementation, the method further includes: reporting, by the UE, an amount of the data to-be-transmitted through a buffer status report (BSR) or preset signaling, where the amount of the data to-be-transmitted contains an amount of existing data to-be-transmitted and an amount of data that is predicted to be transmitted.

In an alternative implementation, the method further includes: skipping, by the UE, indicating that there is subsequent data transmission when the UE determines that a generation interval of the data to-be-transmitted exceeds an interval threshold, and transmitting, by the UE, data generated next through a next SDT process upon next data generation.

The above interval threshold may be configured by the base station through a system message, or may be a threshold set by a protocol.

In an alternative implementation, the associated information of the data to-be-transmitted includes a channel quality of a beam currently accessed by the UE.

In an alternative implementation, the associated information of the data to-be-transmitted further includes a channel quality and a beam identifier of at least one candidate beam.

In an alternative implementation, indicating, by the UE, in the SDT the associated information of the data to-be-transmitted specifically includes: indicating, by the UE, the associated information of the data to-be-transmitted through message 3 (Msg3) or message a (MsgA) of the SDT.

In an alternative implementation, when transmission of the data to-be-transmitted cannot be completed in one SDT, the UE indicates in the SDT the associated information of the data to-be-transmitted.

The First Implementation

Figure 4:
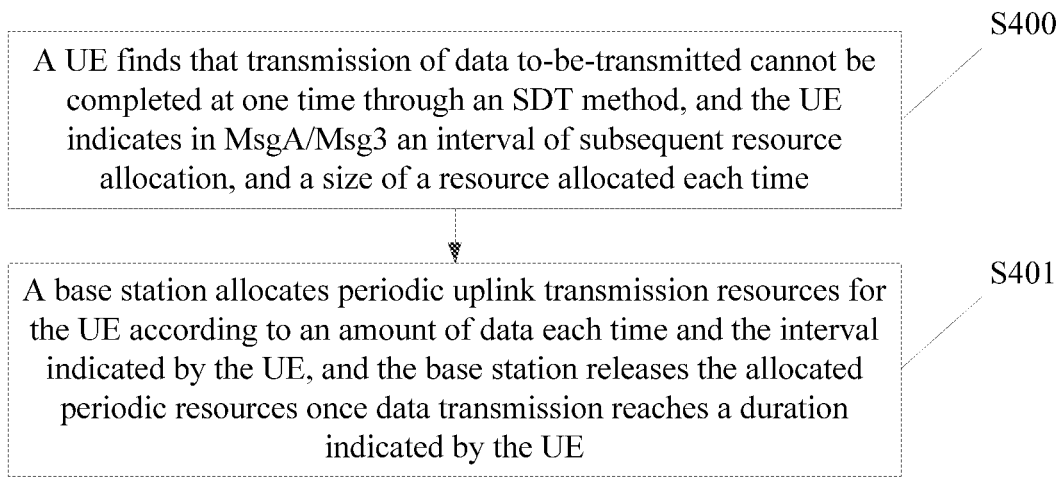
FIG. 4 is a schematic flowchart illustrating a method for uplink data transmission provided in a first implementation of the disclosure.

The first implementation of the disclosure provides a method for uplink data transmission. An implementation scenario of the implementation of the disclosure may be the communication system illustrated in FIG. 1 or other communication systems. The technical scenario of the implementation of the disclosure may specifically include: a UE determines that data to-be-transmitted cannot be transmitted through one SDT. Referring to FIG. 4, FIG. 4 illustrates a method for uplink data transmission. As illustrated in FIG. 4, the method includes the following.

At S400, the UE finds that transmission of the data to-be-transmitted cannot be completed at one time through an SDT method, and the UE indicates in MsgA/Msg3 an interval of subsequent resource allocation, an amount of data that can be transmitted in each resource allocation, a duration of data transmission, or a number of times of subsequent resource allocation.

Optionally, the MsgA/Msg3 may contain an RRC message, and the interval of subsequent resource allocation, the amount of data that can be transmitted in each resource allocation, or the duration of data transmission (the duration of data generation), or the number of times of subsequent resource allocation are indicated in the RRC message, so that a base station can reasonably allocate subsequent uplink transmission resources.

At S401, the base station allocates periodic uplink transmission resources for the UE according to an amount of data each time and the interval indicated by the UE, and the base station releases the allocated periodic resources once data transmission reaches the duration indicated by the UE.

When the UE determines that the data to-be-transmitted cannot be transmitted through one SDT, that is, subsequent data transmission is required, the interval of subsequent resource allocation and a size of a resource allocated each time can be indicated in MsgA/Msg3, where MsgA/Msg3 may contain an RRC message, and the interval of subsequent resource allocation, the amount of data that can be transmitted in each resource allocation, or the duration of data transmission (the duration of data generation) are indicated in the RRC message, so that the base station can reasonably allocate subsequent uplink transmission resources, and accordingly, the UE can transmit uplink data in time to avoid resource waste. As an example, the base station can allocate periodic uplink transmission resources for the UE according to the amount of data each time and the interval indicated by the UE, and the base station can release the allocated periodic resources after the data transmission reaches the duration indicated by the UE. As such, timely and efficient data transmission can be realized with the least signaling interaction.

The Second Implementation

Figure 5:
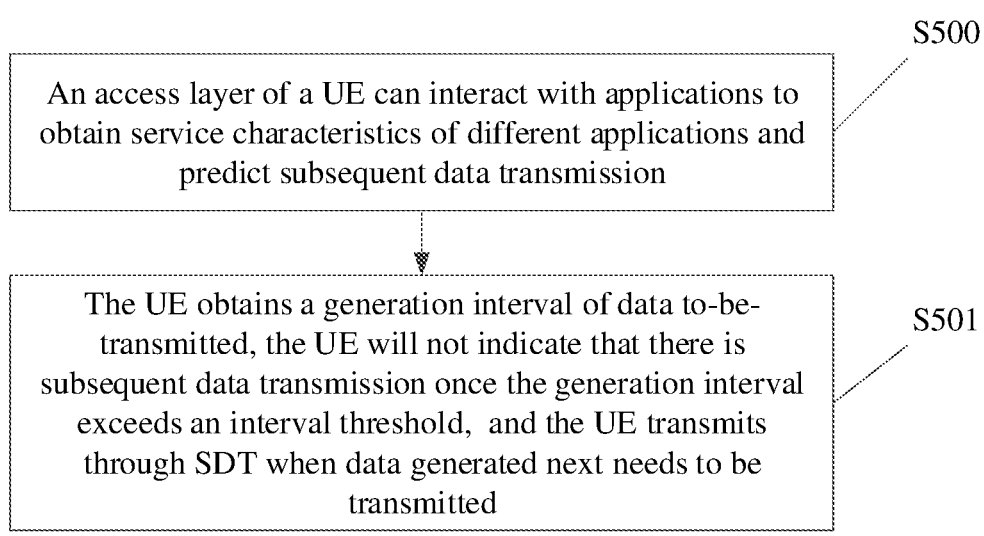
FIG. 5 is a schematic flowchart illustrating a method for uplink data transmission provided in a second implementation of the disclosure.

The second implementation of the disclosure provides a method for uplink data transmission. An implementation scenario of the implementation of the disclosure may be the communication system illustrated in FIG. 1 or other communication systems. Referring to FIG. 5, FIG. 5 illustrates a method for uplink data transmission. As illustrated in FIG. 5, the method includes the following.

At S500, an access layer of a UE can interact with applications to obtain service characteristics of different applications and predict subsequent data transmission, and turn to subsequent operations if the subsequent data transmission is multiple data transmissions.

The interaction between the access layer of the UE and the application belongs to internal implementation of the UE, and may be implemented in various ways, for example, the UE can count service characteristics of different applications (e.g., WeChat® and Weibo®) by itself, which is not limited in the disclosure.

At S501, the UE obtains a generation interval of data to-be-transmitted, and the UE will not indicate that there is subsequent data transmission once the generation interval exceeds an interval threshold (indicate that there is subsequent data transmission only when the generation interval is shorter than the interval threshold). When the interval threshold is exceeded, the UE transmits through SDT when data generated next needs to be transmitted.

Figure 6:
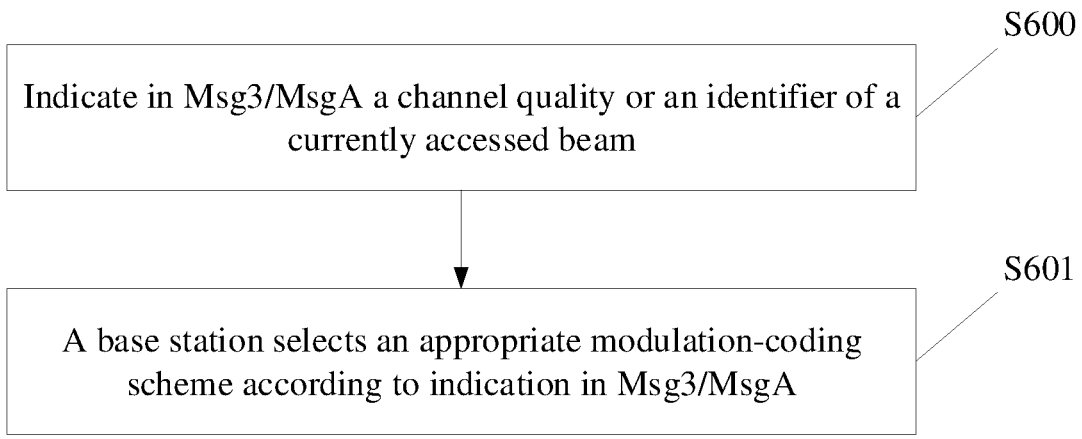
FIG. 6 is a schematic flowchart illustrating a method for uplink data transmission provided in a third implementation of the disclosure.

According to the technical solution of the disclosure, if a duration for the UE to generate data next time exceeds the interval threshold, the UE skips indicating the need for subsequent transmission resources (that is, indicate that there is subsequent transmission when the duration is shorter than the interval threshold). The UE will re-initiate an SDT process once there is data transmission next time. As such, it is avoided that a current beam cannot support data transmission due to UE movement in case of excessively long interval, which can improve reliability of data transmission and a network performance The Third Implementation The third implementation of the disclosure provides a method for uplink data transmission. An implementation scenario of the implementation of the disclosure may be the communication system illustrated in FIG. 1 or other communication systems. Referring to FIG. 6, FIG. 6 illustrates a method for uplink data transmission. As illustrated in FIG. 6, the method includes the following.

At S600, a UE indicates in Msg3/MsgA a channel quality or an identifier of a currently accessed beam.

At S601, a base station selects an appropriate modulation-coding scheme according to indication in Msg3/MsgA.

According to the technical solution of the disclosure, the UE can indicate in MsgA or Msg3 the channel quality of the currently accessed beam. Optionally, the UE can indicate a channel quality of a (candidate) good beam, such as a channel quality of a beam exceeding a signal-quality threshold. Since the UE needs to transmit data multiple times, a beam accessed by the UE may change during the multiple data transmission (the UE determines a corresponding preamble according to a selected beam in a random access procedure, and the base station determines the beam accessed by the UE according to the preamble transmitted by the UE). In order to improve transmission efficiency, the UE reports a signal quality of the accessed beam, such as a channel quality index (CQI), which helps the base station to select an appropriate modulation-coding scheme to improve transmission efficiency and spectrum efficiency. The UE can report the channel quality of the currently accessed beam, and can also report a signal quality of a candidate beam(s). If the currently accessed beam is the strongest beam in a serving cell measured by the UE and the UE also detects one or more second-strongest beams, the UE can report a beam identifier and a channel quality of the second-strongest beam or only report the beam ID, so that the base station can know a candidate beam(s) of the UE, select a candidate beam to provide services for the UE, and know a channel quality of the candidate beam measured by the UE. As such, when a beam serving the UE changes, an appropriate modulation-coding scheme can be selected for data transmission.

It can be understood that, in order to implement the above functions, the UE includes software modules and/or hardware corresponding to the respective functions. In combination with algorithm steps/operations of each example described in the implementations disclosed herein, the disclosure can be implemented in hardware or a combination of hardware and computer software. Whether a function is implemented by way of hardware or computer software driving hardware depends on particular application and design constraints of the technical solution. Those skilled in the art may use different methods to implement the described functions for each particular application in combination with the implementations, but such implementation should not be considered as beyond the scope of the disclosure.

According to implementations of the disclosure, functional modules/units may be divided for an electronic device in accordance with the foregoing method examples. For example, functional units may be divided according to corresponding functions, and two or more functions may be integrated into one processing unit. The above-mentioned integrated unit can be implemented in the form of hardware. It should be noted that, the division of units in implementations of the disclosure is schematic and is merely a logical function division; there may be other division manners in actual implementation.

Figure 7:
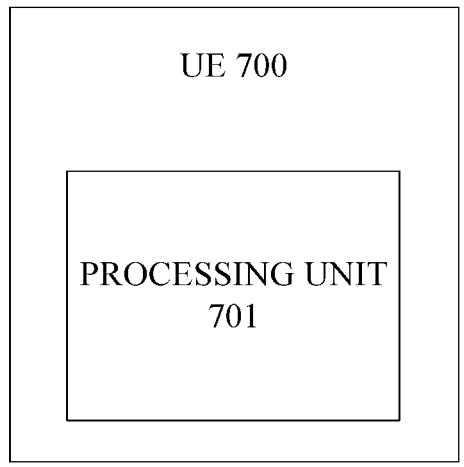
FIG. 7 is a schematic structural diagram illustrating a user equipment (UE) provided in implementations of the disclosure.

In the case of dividing functional units according to respective functions, FIG. 7 is a schematic diagram of a UE. As illustrated in FIG. 7, a UE 700 includes a processing unit 701. The processing unit 701 can be used to support the UE to execute the operations At S300 and other operations, and/or other processes of the technical solutions described herein.

It should be noted that, all relevant contents of the operations in the foregoing method implementations can be cited for the description of functions of corresponding function units, which will not be repeated herein.

In the case of adopting an integrated unit, a UE may include a processing unit, a storage unit, and a communication unit. The processing unit is configured to control and manage actions of the UE, for example, to support the UE to perform the operations performed by the processing unit. The storage unit is configured to support an electronic device to execute program codes and data stored, and the like. The communication module is configured to support communication between the UE and other devices.

The processing unit may be a processor or a controller. The processing unit can implement or perform various exemplary logic blocks, modules/units, and circuits described in conjunction with disclosed contents of the disclosure. The processor may also be a combination of computing functions, for instance, a combination of one or more microprocessors, a combination of digital signal processing (DSP) and a microprocessor, etc. The storage unit may be a memory. Specifically, the communication unit may be a device that interacts with other electronic devices, such as a radio frequency circuit, a Bluetooth chip, and a Wi-Fi chip.

It can be understood that, interface connection relationships between modules/units illustrated in implementation of the disclosure are only schematic illustration, and do not constitute a structural limitation on the UE. In other implementations of the disclosure, the UE may also adopt different interface connection modes in the foregoing implementations, or a combination of multiple interface connection modes.

Figure 8:
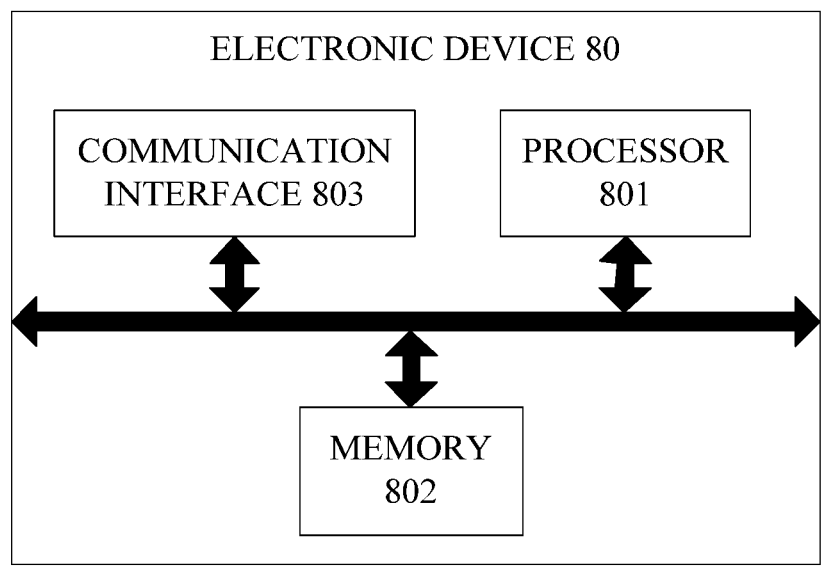
FIG. 8 is a schematic structural diagram illustrating an electronic device provided in implementations of the disclosure.

Referring to FIG. 8, FIG. 8 illustrates an electronic device 80 provided in implementations of the disclosure. The electronic device 80 (e.g., a UE) includes a processor 801, a memory 802, and a communication interface 803. The processor 801, the memory 802, and the communication interface 803 are connected to each other through a bus.

The memory 802 may include, but is not limited to, a random access memory (RAM), a read-only memory (ROM), an erasable programmable ROM (EPROM), or a compact disc ROM (CD-ROM). The memory 802 is configured to store related computer programs and data. The communication interface 803 is configured to receive and transmit data.

The processor 801 may be one or more central processing units (CPU). If the processor 801 is one CPU, the CPU may be a single-core CPU or a multi-core CPU.

The processor 801 may include one or more processing units. For example, the processing unit may include an application processor (AP), a modem processor, a graphics processing unit (GPU), an image signal processor (ISP), a controller, a video codec, a digital signal processor (DSP), a baseband processor, and/or a neural-network processing unit (NPU), etc. Different processing units may be independent components, and may also be integrated in one or more processors. In some implementations, the UE may also include one or more processing units. The controller can be configured to generate an operation control signal according to an instruction operation code and a timing signal, and complete control of fetching and executing an instruction. In other implementations, a memory may also be provided in the processing unit for storing instructions and data. Exemplarily, the memory in the processing unit may be a cache memory. The memory can hold instructions or data that have just been used or recycled by the processing unit. If the processing unit needs to use the instruction or data again, the instruction or data can be called directly from the memory. As such, repeated access can be avoided, and the waiting time of the processing unit can be reduced, thereby improving efficiency of the UE in processing data or executing instructions.

In some implementations, the processor 801 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, an SIM card interface and/or a USB interface, etc. The USB interface is an interface conforming to the USB standard specification. Specifically, the USB interface may be a Mini USB interface, a Micro USB interface, a USB Type C interface, etc. The USB interface may be used to connect a charger to charge the UE, and can also be used to transmit data between the UE and peripheral equipment. The USB interface can also be used to connect a headset to play audio through the headset.

The processor 801 of the electronic device 80 is configured to read computer program codes stored in the memory 802 and perform: indicating, by the UE, in SDT associated information of data to-be-transmitted when the UE is in an inactive state and has the data to-be-transmitted.

All relevant contents of scenarios involved in the foregoing method implementations can be cited for the description of functions of corresponding function units, which will not be repeated herein.

Implementations of the disclosure further provide a chip system. The chip system includes at least one processor, at least one memory, and an interface circuit. The memory, the interface circuit, and the at least one processor are interconnected through wires. The at least one memory stores computer programs which, when executed by the processor, are operable to execute the method flow illustrated in FIG. 3, FIG. 4, FIG. 5, and FIG. 6.

Implementations of the disclosure further provide a non-transitory computer-readable storage medium. The non-transitory computer-readable storage medium stores computer programs which, when run on a network device, are operable to execute the method flow illustrated in FIG. 3, FIG. 4, FIG. 5, and FIG. 6.

Implementations of the disclosure further provide a computer program product. The computer program product, when run on a terminal, is operable to execute the method flow illustrated in FIG. 3, FIG. 4, FIG. 5, and FIG. 6.

Implementations of the disclosure further provide a terminal device. The terminal device includes a processor, a memory, a communication interface, and one or more programs. The one or more programs are stored in the memory and configured to be executed by the processor. The programs include instructions which are operable to execute the operations in the method of the implementations illustrated in FIG. 3, FIG. 4, FIG. 5, and FIG. 6.

The foregoing technical solutions of the implementations of the disclosure are mainly described from the viewpoint of execution of the method. It can be understood that, in order to implement the above functions, the electronic device includes hardware structures and/or software modules corresponding to the respective functions. Those skilled in the art should readily recognize that, in combination with the exemplary units and scheme steps/operations described in the implementations disclosed herein, the disclosure can be implemented in hardware or a combination of hardware and computer software. Whether a function is implemented by way of hardware or computer software driving hardware depends on the particular application and design constraints of the technical solution. Those skilled in the art may use different methods to implement the described functions for each particular application, but such implementation should not be considered as beyond the scope of the disclosure.

According to the implementations of the disclosure, functional units may be divided for the electronic device in accordance with the foregoing method examples. As an example, functional units may be divided according to corresponding functions, and two or more functions may be integrated into one processing unit. The above-mentioned integrated unit can be implemented in the form of hardware or software functional units. It should be noted that, the division of units in implementations of the disclosure is schematic and is merely a logical function division; there may be other division manners in actual implementation.

It is to be noted that, for the sake of simplicity, the foregoing method implementations are described as a series of action combinations, however, it will be appreciated by those skilled in the art that the disclosure is not limited by the sequence of actions described. That is because that, according to the disclosure, certain steps/operations may be performed in other order or simultaneously. Besides, it will be appreciated by those skilled in the art that the implementations described in the specification are exemplary implementations and the actions and modules/units involved are not necessarily essential to the disclosure.

In the foregoing implementations, the description of each implementation has its own emphasis. For the parts not described in detail in one implementation, reference may be made to related descriptions in other implementations.

In the implementations of the disclosure, it should be understood that, the apparatus/equipment/device disclosed in implementations provided herein may be implemented in other manners. For example, the device implementations described above are merely illustrative; for instance, the division of units is only a logical function division and there can be other manners of division during actual implementations, for example, multiple units or assemblies may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product. The computer software product is stored in a memory and includes instructions for causing a computer device (which may be a personal computer, a server, or a network device and so on) to perform all or part of the operations of the method described in the various implementations of the disclosure. The memory may include various medium capable of storing program codes, such as a universal serial bus (USB), a ROM, a RAM, a removable hard disk, Disk, CD, or the like.

Implementations of the disclosure provide a method for uplink data transmission and related products, so that a user equipment (UE) can indicate in small data transmission (SDT) associated information of data to-be-transmitted when the UE is in an inactive state and has the data to-be-transmitted, and report the associated information to a base station, thereby improving a network performance.

In a first aspect, a method for uplink data transmission is provided. The method is applied to a UE. The method includes: indicating, by the UE, in SDT associated information of data to-be-transmitted, when the UE is in an inactive state and has the data to-be-transmitted.

In a second aspect, a UE is provided. The UE includes a processing unit. The processing unit is configured to indicate in SDT associated information of data to-be-transmitted when the UE is in an inactive state and has the data to-be-transmitted.

In a third aspect, an electronic device is provided. The electronic device includes a processor, a memory, a communication interface, and one or more programs. The one or more programs are stored in the memory and configured to be executed by the processor. The programs include instructions which are operable to execute the operations of the method in the first aspect.

In a fourth aspect, a non-transitory computer-readable storage medium is provided. The non-transitory computer-readable storage medium stores computer programs for electronic data interchange. The computer programs are operable with a computer to execute the method in the first aspect.

In a fifth aspect, a computer program product is provided. The computer program product includes a non-transitory computer-readable storage medium storing computer programs. The computer programs are operable with a computer to execute all or part of the operations in the first aspect of implementations of the disclosure. The computer program product may be a software installation package.

In a sixth aspect, a chip system is provided. The chip system includes at least one processor, at least one memory, and a transceiver. The memory, the transceiver, and the at least one processor are interconnected through lines. The at least one memory stores computer programs which, when executed by the processor, are operable to execute the method in the first aspect.

According to the technical solution of the disclosure, when the UE is in the inactive state and has data to-be-transmitted, the UE can indicate in the SDT the associated information of the data to-be-transmitted, and report the associated information to the base station, so that the base station can configure resources for the UE according to the associated information, thereby improving the network performance.

It will be understood by those of ordinary skill in the art that all or part of the operations of the method of the various implementations described above may be accomplished by means of a program to instruct associated hardware, the program may be stored in a computer-readable memory. The memory may include a flash memory, a ROM, a RAM, Disk or CD, and so on.

What is claimed is:

1. A method for uplink data transmission, performed by a user equipment (UE) and comprising:
   indicating in small data transmission (SDT) associated information of data to-be-transmitted, when the UE is in an inactive state and has the data to-be-transmitted, the method further comprising:
      reporting an amount of the data to-be-transmitted through a buffer status report (BSR) or preset signaling, wherein the amount of the data to-be-transmitted contains an amount of existing data to-be-transmitted.

2. The method of claim 1, wherein the associated information of the data to-be-transmitted comprises one or any combination of the following:
an interval of resource allocation, an amount of data that can be transmitted in each resource allocation, a duration of data transmission, and a number of times of subsequent resource allocation.

3. The method of claim 1, further comprising:
determining a service characteristic of the data to-be-transmitted; and
wherein indicating in the SDT the associated information of the data to-be-transmitted comprises:
indicating in the SDT the associated information of the data to-be-transmitted, when the service characteristic is different from a service characteristic reported before the UE enters the inactive state.

4. The method of claim 3, wherein the service characteristic comprises one or any combination of the following:
a size of service data generated each time, an interval period of service generation, and a time deviation of service data generation.

5. The method of claim 1, further comprising:
skipping indicating that there is subsequent data transmission when the UE determines that a generation interval of the data to-be-transmitted exceeds an interval threshold, and transmitting data generated next through the SDT upon next data generation.

6. The method of claim 1, wherein the associated information of the data to-be-transmitted comprises a channel quality of a beam currently accessed by the UE.

7. The method of claim 1, wherein the associated information of the data to-be-transmitted comprises:
a beam identifier of at least one candidate beam.

8. The method of claim 1, wherein indicating in the SDT the associated information of the data to-be-transmitted comprises:
indicating the associated information of the data to-be-transmitted through message 3 (Msg3) or message a (MsgA) of the SDT.

9. The method of claim 1, wherein indicating in the SDT the associated information of the data to-be-transmitted comprises:
indicating in the SDT the associated information of the data to-be-transmitted, when transmission of the data to-be-transmitted cannot be completed in one SDT.

10. The method of claim 1, wherein the associated information of the data to-be-transmitted comprises a beam identifier of a beam currently accessed by the UE.

11. The method of claim 1, wherein the associated information of the data to-be-transmitted comprises:
a channel quality and a beam identifier of at least one candidate beam.

12. The method of claim 1, wherein the amount of the data to-be-transmitted further contains an amount of data that is predicted to be transmitted.

13. A user equipment (UE), comprising:
a processor; and
a memory coupled with the processor and storing programs;
the programs comprising instructions operable with the processor to:
indicate in small data transmission (SDT) associated information of data to-be-transmitted, when the UE is in an inactive state and has the data to-be-transmitted,
wherein the processor is further configured to:
report an amount of the data to-be-transmitted through a buffer status report (BSR) or preset signaling, wherein
the amount of the data to-be-transmitted contains an amount of existing data to-be-transmitted.

14. A non-transitory computer-readable storage medium storing computer programs which, when executed by a user equipment (UE), cause the UE to carry out actions, comprising:
indicating in small data transmission (SDT) associated information of data to-be-transmitted, when the UE is in an inactive state and has the data to-be-transmitted,
wherein the computer programs, when executed by the UE, are further configured to cause the UE to carry out the actions, comprising:
reporting an amount of the data to-be-transmitted through a buffer status report (BSR) or preset signaling, wherein
the amount of the data to-be-transmitted contains an amount of existing data to-be-transmitted.

15. The UE of claim 13, wherein the associated information of the data to-be-transmitted comprises one or any combination of the following:
an interval of resource allocation, an amount of data that can be transmitted in each resource allocation, a duration of data transmission, and a number of times of subsequent resource allocation.

16. The UE of claim 13, wherein
the processor is further configured to:
determine a service characteristic of the data to-be-transmitted; and
the processor configured to indicate in the SDT the associated information of the data to-be-transmitted is configured to:
indicate in the SDT the associated information of the data to-be-transmitted, when the service characteristic is different from a service characteristic reported before the UE enters the inactive state.

17. The UE of claim 13, wherein the processor is further configured to:
skip indicating that there is subsequent data transmission when the UE determines that a generation interval of the data to-be-transmitted exceeds an interval threshold, and transmit data generated next through the SDT upon next data generation.

18. The UE of claim 13, wherein the processor configured to indicate in the SDT the associated information of the data to-be-transmitted is configured to:
indicate the associated information of the data to-be-transmitted through message 3 (Msg3) or message a (MsgA) of the SDT.

19. The UE of claim 13, wherein the processor configured to indicate in the SDT the associated information of the data to-be-transmitted is configured to:
indicate in the SDT the associated information of the data to-be-transmitted, when transmission of the data to-be-transmitted cannot be completed in one SDT.

20. The UE of claim 13, wherein the associated information of the data to-be-transmitted comprises a channel quality of a beam currently accessed by the UE.

* * * * *